(12) United States Patent
Ishio et al.

(10) Patent No.: US 7,739,013 B2
(45) Date of Patent: Jun. 15, 2010

(54) VEHICULAR ELECTRONIC CONTROL APPARATUS AND METHOD FOR CONTROLLING VEHICLE

(75) Inventors: Masato Ishio, Hyogo (JP); Junji Takahashi, Hyogo (JP); Takuhiro Tarumoto, Hyogo (JP); Yasuhiro Shirota, Hyogo (JP); Tsuyoshi Takatori, Hyogo (JP); Kaoru Noumi, Hyogo (JP); Hiroshi Arita, Hyogo (JP); Koji Uchihashi, Hyogo (JP); Koichi Oogaki, Hyogo (JP); Shinichiro Takatomi, Hyogo (JP); Masatoshi Hagiwara, Hyogo (JP); Takehito Iwanaga, Hyogo (JP)

(73) Assignee: Fujitsu Ten Limited, Kobe-shi (JP)

( * ) Notice: Subject to any disclaimer, the term of this patent is extended or adjusted under 35 U.S.C. 154(b) by 1098 days.

(21) Appl. No.: 11/294,407

(22) Filed: Dec. 6, 2005

(65) Prior Publication Data

US 2006/0122752 A1   Jun. 8, 2006

(30) Foreign Application Priority Data

Dec. 6, 2004   (JP)   ............................. 2004-352807
Nov. 7, 2005   (JP)   ............................. 2005-321719

(51) Int. Cl.
*G06F 17/00*   (2006.01)
*G06F 7/00*   (2006.01)

(52) U.S. Cl. ............................. 701/48; 701/54; 701/84; 701/87; 701/90; 701/99; 180/69.3

(58) Field of Classification Search .................... 701/48
See application file for complete search history.

(56) References Cited

U.S. PATENT DOCUMENTS

| 5,091,856 | A | 2/1992 | Hasegawa et al. |
| 5,369,584 | A | 11/1994 | Kajiwara |
| 5,586,118 | A | 12/1996 | Hashimoto et al. |
| 5,659,702 | A | 8/1997 | Hashimoto et al. |
| 5,696,904 | A | 12/1997 | Hashimoto et al. |
| 5,764,919 | A | 6/1998 | Hashimoto |
| 5,957,985 | A * | 9/1999 | Wong et al. .................... 701/33 |
| 6,334,081 | B1 | 12/2001 | Robinson et al. |
| 6,360,152 | B1 | 3/2002 | Ishibashi et al. |
| 6,463,373 | B2 * | 10/2002 | Suganuma et al. ............. 701/48 |
| 6,466,851 | B2 | 10/2002 | Kato et al. |
| 6,484,082 | B1 | 11/2002 | Millsap et al. |
| 6,615,366 | B1 * | 9/2003 | Grochowski et al. .......... 714/10 |
| 2001/0056320 | A1 | 12/2001 | Kato et al. |
| 2002/0007979 | A1 | 1/2002 | Wilson |

(Continued)

FOREIGN PATENT DOCUMENTS

DE   197 50 026 A1   6/1999

(Continued)

*Primary Examiner*—Thomas G Black
*Assistant Examiner*—Lin B Olsen
(74) *Attorney, Agent, or Firm*—Oliff & Berridge, PLC

(57) ABSTRACT

A vehicular electronic control apparatus includes a vehicle control section and a unit control section. The vehicle control section controls a function dependent on a vehicle equipment. The unit control section that controls a function of a unit provided in a vehicle. The vehicle control section and the unit control section are disposed in independent hardwares and software platforms, respectively.

9 Claims, 7 Drawing Sheets

U.S. PATENT DOCUMENTS

| | | |
|---|---|---|
| 2002/0038647 A1 | 4/2002 | Tashiro et al. |
| 2002/0099487 A1 | 7/2002 | Suganuma et al. |
| 2002/0112042 A1 | 8/2002 | Coburn, II et al. |
| 2004/0128037 A1 | 7/2004 | Miyamoto et al. |
| 2004/0158379 A1 | 8/2004 | Horbaschek |
| 2005/0004726 A1 | 1/2005 | Paquet |

FOREIGN PATENT DOCUMENTS

| | | |
|---|---|---|
| EP | 0 392 411 A2 | 10/1990 |
| EP | 0 791 506 A2 | 8/1997 |
| EP | 1 158 718 A2 | 11/2001 |
| EP | 1 371 524 A2 | 12/2003 |
| JP | A-2001-182817 | 7/2001 |

* cited by examiner

VEHICULAR ELECTRONIC CONTROL APPARATUS AND METHOD FOR CONTROLLING VEHICLE

This application is based upon and claims the benefit of priority from Japanese Patent Application No. 2004-352807 filed on Dec. 6, 2004 and Japanese Patent Application No. 2005-321719 filed on Nov. 7, 2005, the entire contents of which are incorporated herein by reference.

BACKGROUND OF THE INVENTION

1. Field of the Invention

The invention relates to a vehicular electronic control apparatus that controls powertrain units, such as an engine and a transmission, and a method for controlling vehicle using the vehicular electronic control apparatus.

2. Description of the Related Art

Vehicular electronic control apparatuses (hereinafter referred to as "ECU") exchange signals with a vehicular control mechanism to perform electronic control on a vehicle, and implements a desired control with one ECU, such as a powertrain ECU and a brake control ECU.

A vehicle is equipped with a large number of electronic control apparatuses such as an economy running ECU that controls automatic stop/restart of an engine when predetermined conditions are satisfied, a body ECU that controls lamps, doors, etc., an airbag ECU, and a security ECU, as well as the above-described powertrain ECU and brake control ECU. The respective ECUs individually and independently control objects to be controlled, but they are often required to exchange information with other ECUs.

Therefore, in order to perform various kinds of control with correlating a plurality of ECUs mounted on a vehicle with each other, while the plurality of ECUs are connected to a common path line, mutual communication control is performed using a controller area network (hereinafter referred to as "CAN") protocol that is a typical standard network protocol (for example, see U.S. Pat. Nos. 5,586,118; 5,659,702; 5,696,904; and 5,764,919).

SUMMARY OF THE INVENTION

On the other hand, the powertrain ECU controls engines and automatic transmissions, and calculates control command values such as fuel injection amount, ignition timing, and gear shift timing on the basis of sensor signals such as intake air amount and air-fuel ratio, to thereby control actuators such as an injector and an ignition coil on the basis the calculation result.

FIG. 7 is a view a configuration of a powertrain ECU according to a related art. In this figure, an engine control software (ENG control software) 61 for controlling a driving status of a vehicle engine, and an electronic-control-transmission control software (ECT control software) 62 for controlling a vehicle transmission are disposed on a software platform (PF) 64 through an interface (I/F) 63 for transmitting and receiving physical quantities.

In such a vehicle control system, since the amount of data that is transmitted and received between the ENG control software 61 and the ECT control software 62 is large, the software is disposed on the same platform so that a communication load in the CAN connected to the other ECUs is reduced.

Also, as shown in FIG. 7, the ENG control software 61 includes, as part of its program, a program relating to vehicle equipment such as a program relating to ON/OFF of an air conditioner (A/C) and a program relating to information from an immobilizer. The ECT control program 62 includes a program relating a shift control system cooperating with navigation system, for example, a program for performing a speed change on the basis of information from a navigation device. Further, both the ENG control software 61 and the ECT control software 62 also include a program for cooperating with each other to calculate torque demands.

Next, an example of the programs relating to the vehicle equipment will be described. As shown in FIG. 8, for example, if a vehicle is equipped with an air conditioner (A/C) 65 as the vehicle equipment, an ON/OFF signal is input to the ENG control software 61 as an operating status flag from the A/C 65. The ENG control software 61 calculates a torque in consideration of the load of the air conditioner. As such, various programs relating to various kinds of vehicle equipment are included in the ENG control software 61 and the ECT control software 62.

The power train ECU is configured as described above. The ENG control software and the ECT control software are disposed on the software platform through the interface (I/F) that transmits and receives physical quantities. An interface between the software platform and the respective software applications is defined by physical quantities such as injection amount, temperature, and pressure and is thin in terms of software. Thus, it is easy to mount/demount, that is, add/change the ENG software or the ECT software with respect to the software platform. However, since a vehicle control application dependent on the vehicle equipment and a control application of the powertrain unit are closely linked with one another, it is difficult to mount/demount one of the vehicle control application and the control application of the powertrain unit with respect to the other.

Accordingly, if vehicle equipment is added or removed later, it is necessary to modify program contents of the engine control program. However, since the engine control program is unique to the engine, any alternative program does not exist, so that the program should be corrected.

Further, as described above, a function dependent on the vehicle equipment and a function of the powertrain unit are mixed in the ENG control software and the ECT control software. When new ENG control software or ECT control software is developed, the number of software variations increases based on number of vehicle equipment×number of units. Thus, a problem arises in that every variation should be optimized, that the number of development processes increases, and the number of ECUs increases.

Moreover, changing of vehicle equipments affect a wide range and there is a limit to evaluation of all combinations. Thus, another problem also arises in that quality deteriorates and that since a timing at which specifications of a vehicle-equipment-dependent part are determined and a timing at which specifications of a unit-dependent part are determined may be different, the changing would affect a part the specifications of which have already been determined.

On the other hand, a vehicle has recently been equipped with a larger number of vehicle equipments such as an immobilizer serving as an antitheft device, an economy running (ECO) system for automatically performing idling stop when the vehicle stops to reduce exhaust gas, an intelligent parking assist (IPA) for automatically parking a vehicle using an electrically-driven power steering wheel and a back-guide monitor, an adaptive cruise control (ACC) system having a function of following a foregoing vehicle using a combination of radar such as millimeter-wave radar and cruise, a shift control system cooperating with navigation system for automatically decelerating on the basis of map information of a navigation device, and an air conditioner (A/C).

If the number of vehicle equipment increases as such, the traffic of communication with the vehicle equipments increases and the processing load of the CPU of the powertrain ECU increases. Thus, a still another problem also arises in that the excessive load of the CPU may influences the vehicle control.

The invention provides a vehicular electronic control apparatus, which enables to change a vehicle equipment without requiring change of a unit control device, that is, can facilitate mounting/demounting, i.e., adding/changing of the vehicle equipments while reducing a load of a CPU, and a method for controlling a vehicle using the vehicular electronic control apparatus.

According to a first aspect of the invention, a vehicular electronic control apparatus includes a vehicle control section and a unit control section. The vehicle control section controls a function dependent on a vehicle equipment. The unit control section controls a function of a unit provided in a vehicle. The vehicle control section and the unit control section are disposed in independent hardwares and software platforms, respectively.

According to a second aspect of the invention, the vehicle control section may include a calculation section and an arbitration section. The calculation section calculates at least one of driving force, which is required or consumed by the vehicle equipment, and torque, which is required or consumed by the vehicle equipment. The arbitration section arbitrates each requirement from the vehicle equipment or each consumption amount of the vehicle equipment. The vehicle control section calculates an arbitration result as a command value to the unit control section.

According to a third aspect of the invention, the vehicle control section may include a determination section that determines whether or not the vehicle is equipped with the vehicle equipment. If the determination section determines that the vehicle is equipped with the vehicle equipment, the vehicle control section notifies the arbitration section of a control value required by the vehicle equipment. If the determination section determines that the vehicle is not equipped with the vehicle equipment, the vehicle control section notifies the arbitration section of a predetermined value as the required control value.

According to the first to third aspects of the invention, the vehicle control section, which controls a function dependent on a vehicle equipment, and the unit control section, which controls a function of a unit provided in a vehicle, are independent of each other. If a powertrain unit is not changed, changing of a vehicle (equipment) does not require changing the unit control section. Also, independence of a function of each control section can be enhanced. Accordingly, it becomes easy to mount/demount, that is, add/change the equipments.

According to a fourth aspect of the invention, physical quantities may be used as information, which is transmitted and received between the vehicle control section and the unit control section.

According to this configuration, physical quantities such as torque and power are used as interfaces of respective control functions of the vehicle control section and the unit control section so as to be independent of software logic. Thus, software dependency relation can be weakened, and efficient development and improved software quality can be achieved at a time when specifications of the vehicle control applications are changed and/or the vehicle control applications are mounted/demounted.

According to a fifth aspect of the invention, a microcomputer of the vehicle control section may have two cores. One of the cores is a dedicated core for communication processing.

According to this configuration, one core of a microcoumputer of the vehicle control section is a dedicated core for communication processing. Thus, vehicle control can be performed without influencing the load of communication.

According to a sixth aspect of the invention, an input circuit section of the vehicle control section may include a configurable hardware that can set or change circuit characteristics and a logic circuit by software.

According to this configuration, the input circuit section of the vehicle control section has configurable hardware, which can set or change circuit characteristics and a logic circuit by software. Accordingly, if any of vehicle equipments is changed, change of hardware can be performed by rewriting software. Thus, it is not necessary to change design of the hardware. As a result, development period can be shortened, and quality improvement can be achieved.

According to a seventh aspect of the invention, a vehicular electronic control apparatus includes a vehicle equipment control program and an engine control program. The vehicle equipment control program calculates data to be used for engine control. The engine control program is unique to an engine provided in a vehicle. The vehicle equipment control program and the engine control program are disposed in independent hardware and software platforms, respectively.

According to this configuration, the vehicle equipment control program that calculates data to be used for engine control and the engine control program inherent in the engine provided in a vehicle are independent of each other. Thus, even when vehicle equipment is added or removed later, it is not necessary to modify the engine control program.

DETAILED DESCRIPTION OF EMBODIMENTS OF THE INVENTION

Hereinafter, a vehicular electronic control apparatus according to embodiments of the invention will be described with reference to the accompanying drawings.

Figure 1:
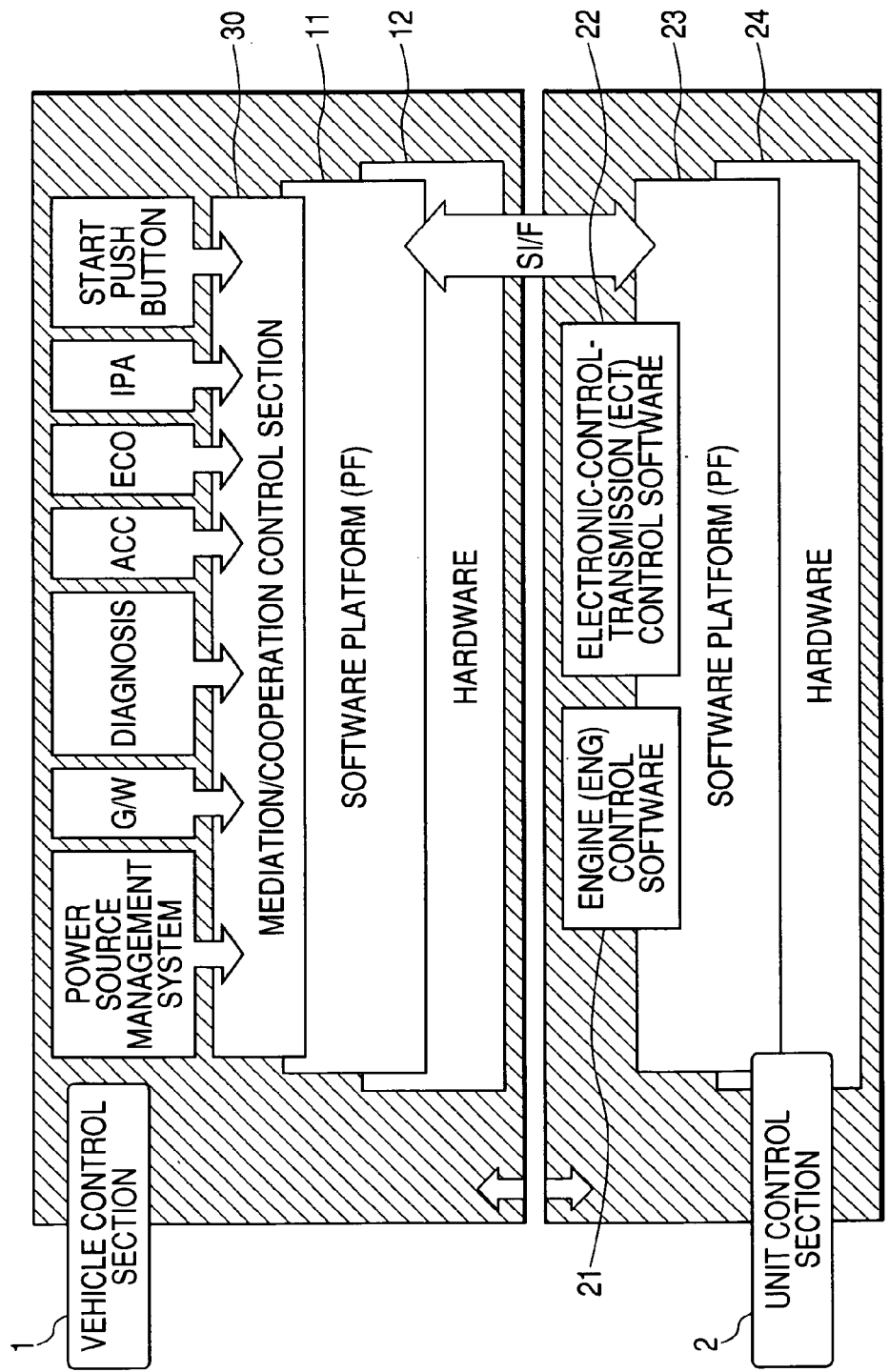
FIG. 1 is a block diagram showing a schematic configuration of a powertrain ECU according to one embodiment of the invention.

FIG. 1 is a block diagram showing a schematic configuration of a powertrain ECU, which serves as the vehicular electronic control apparatus according to this embodiment.

As shown in FIG. 1, the powertrain ECU includes a vehicle control section 1 and a unit control section 2. The vehicle control section 1 includes a software platform (PF) 11 having software, which controls functions depending on vehicle equipments, and a hardware 12. The unit control section 2 includes a software platform (PF) 23 having an engine (ENG) control software 21 and an electronic-control-transmission (ECT) control software 22, and a hardware 24. The unit control section 2 controls units such as an engine and a transmission.

On the software PF 11, software for an arbitration/cooperation control section 30 is implemented and disposed, and a function of power source management, a function of gateways (G/W), and a function of diagnosis are provided as standard-equipment applications. Programs relating to vehicle equipment such as ACC, ECO and IPA are added to the software PF, as required. The ENG control software 21 and ECT control software 22 of the unit control section 2 control units such as the engine and the transmission in accordance with physical quantities, such as a target torque and a target engine revolutions, which are input through ab interface (I/F) 3 from the vehicle control section 1.

Figure 2:
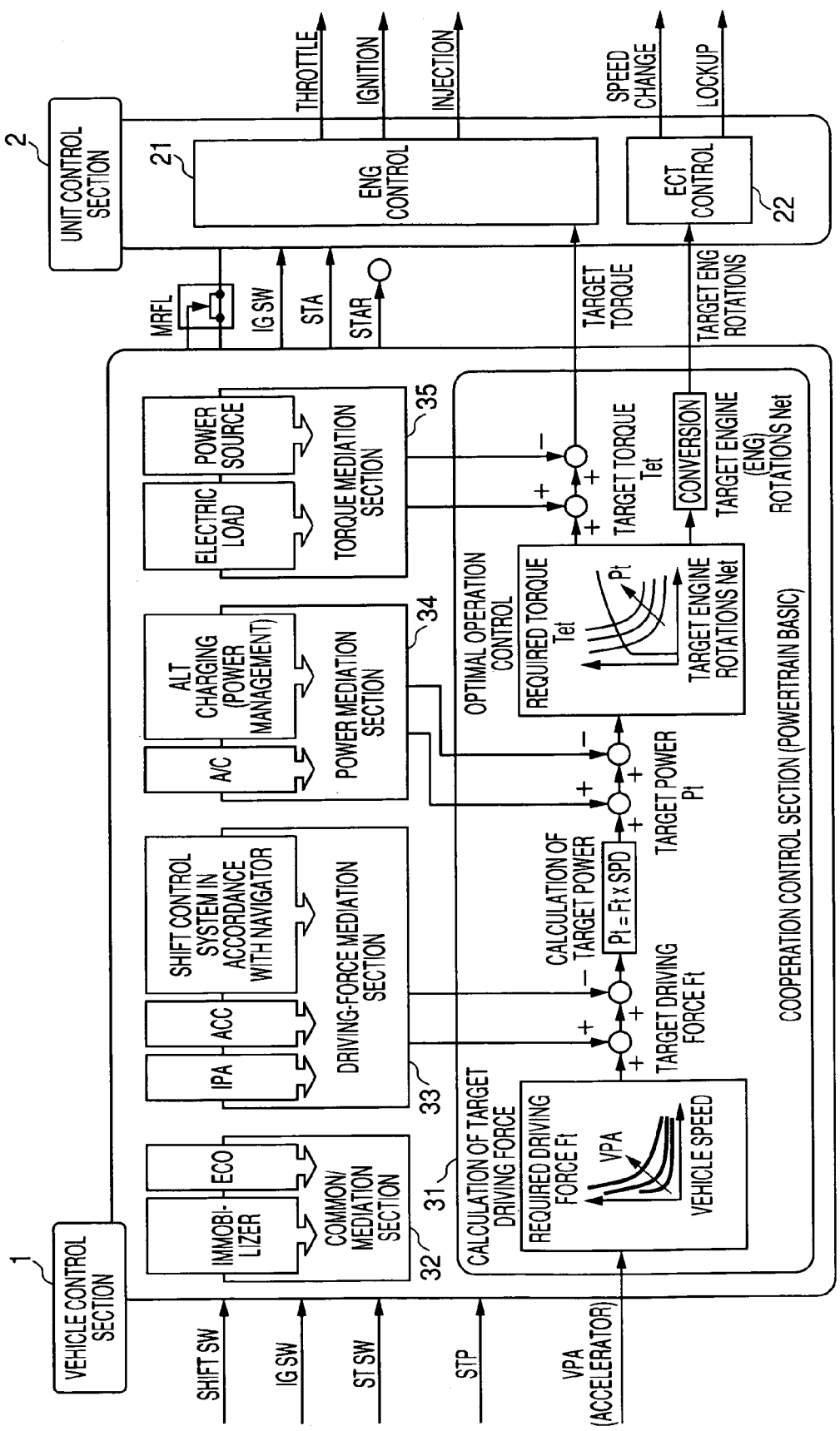
FIG. 2 is a functional block diagram showing the configuration of a vehicle control section 1 shown in FIG. 1, in terms of function.

FIG. 2 is a functional block diagram showing the configuration of the vehicle control section 1 shown in FIG. 1 in terms of function. As shown in FIG. 2, the vehicle control section 1 includes, as the arbitration/cooperation control section 30, a cooperation control section 31, a common/arbitration section 32, a driving-force arbitration section 33, a power arbitration section 34 and a torque arbitration section 35. Also, the vehicle control section 1 is input to signals from a shift switch (SW), an ignition (IG) switch, a starter (ST) switch, stop (STP) lamps and an accelerator (VPA).

If a vehicle equipment software is removed, each of the common/arbitration section 32, the driving-force arbitration section 33, the power arbitration section 34 and the torque arbitration section 35 performs arbitration to deal with a physical quantity of a counterpart equipment as zero or a specified value. If a vehicle equipment software is added, each of the common/arbitration section 32, the driving-force arbitration section 33, the power arbitration section 34 and the torque arbitration section 35 performs arbitration based on a physical value output from a related software and physical values output from other software.

Next, the operation of the vehicle control section 1 shown in FIG. 2 will be described with reference to the flowcharts of FIGS. 3 to 5.

The cooperation control section 31 calculates a target driving force Ft on the basis of the acceleration signal (VPA) and the speed (SPD). The, the cooperation control section 31 obtains a target power Pt based on Pt=Ft×SPD (vehicle speed) The cooperation control section 31 determines a target torque Tet and a target engine rotations Net, which have high mileage, on the basis of the target power Pt, and finally give commands to the unit control section 2.

Figure 3:
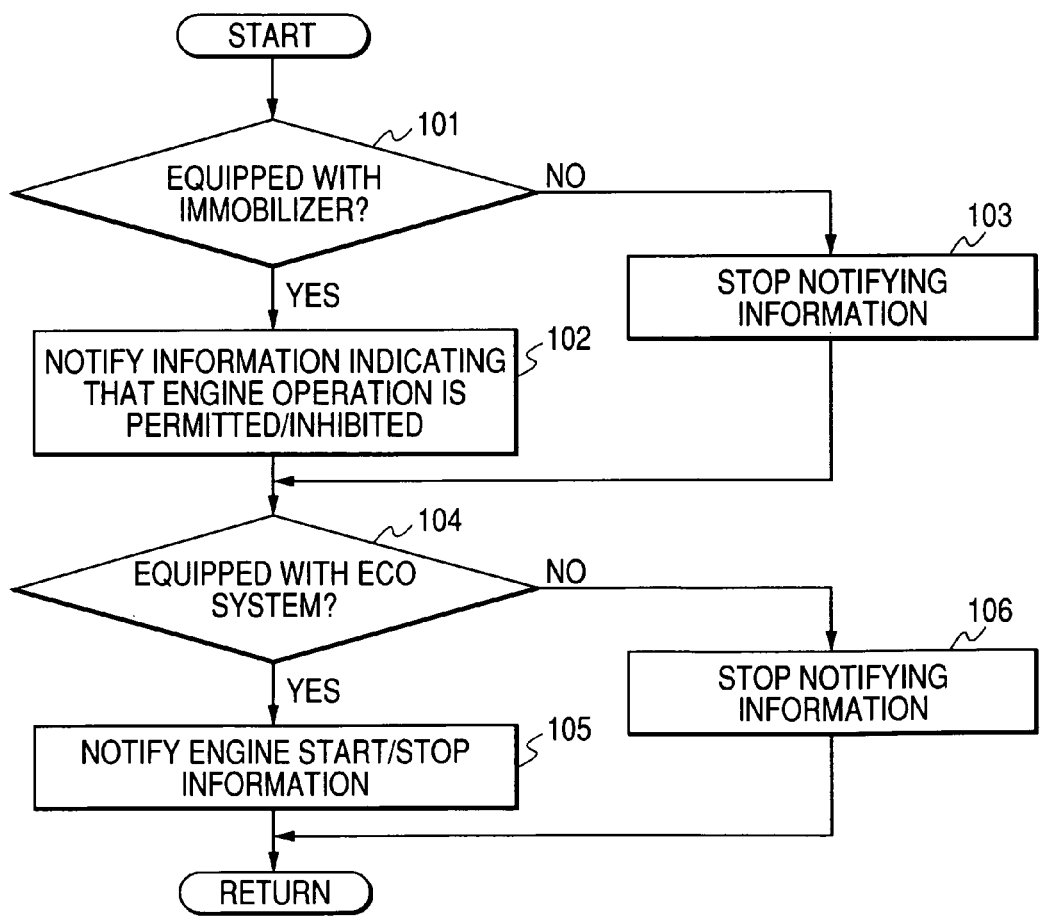
FIG. 3 is a flowchart showing operation of a common/arbitration section 32.

On the other hand, the common/arbitration section 32 always executes a program shown in the flowchart of FIG. 3 during a period in which ignition is turned on. When the program starts, first, the common/arbitration section 32 determines whether or not a vehicle is equipped with an immobilizer (Step 101). If the common/arbitration section 32 determines the vehicle is equipped with the immobilizer, the common/arbitration section 32 notifies the cooperation control section 31 of information indicating that engine operation is permitted or inhibited, from the immobilizer (Step 102). If the common/arbitration section 32 determines that the vehicle is not equipped with the immobilizer, the common/arbitration section 32 stops notifying the cooperation control section 31 of the information indicating that the engine operation is permitted or inhibited (Step 103).

Next, the common/arbitration section 32 determines whether or not the vehicle is equipped with an economy running (ECO) system (Step 104). If the common/arbitration section 32 determines that the vehicle is equipped with the ECO system, the common/arbitration section 32 notifies the cooperation control section 31 of engine start/stop information from the ECO system (Step 105). If the common/arbitration section 32 determines that the vehicle is equipped with the ECO system, the common/arbitration section 32 stops notifying the cooperation control section 31 of the engine start/stop information (Step S106).

Then, the cooperation control section 31 sets the target torque to 0 and gives a command of the target torque to the unit control section 2 during a period in which the immobilizer notifies that the engine operation is inhibited to thereby inhibit the engine from operating, and issues a command based on the engine start/stop information notified from the economy running (ECO) system.

Figure 4:
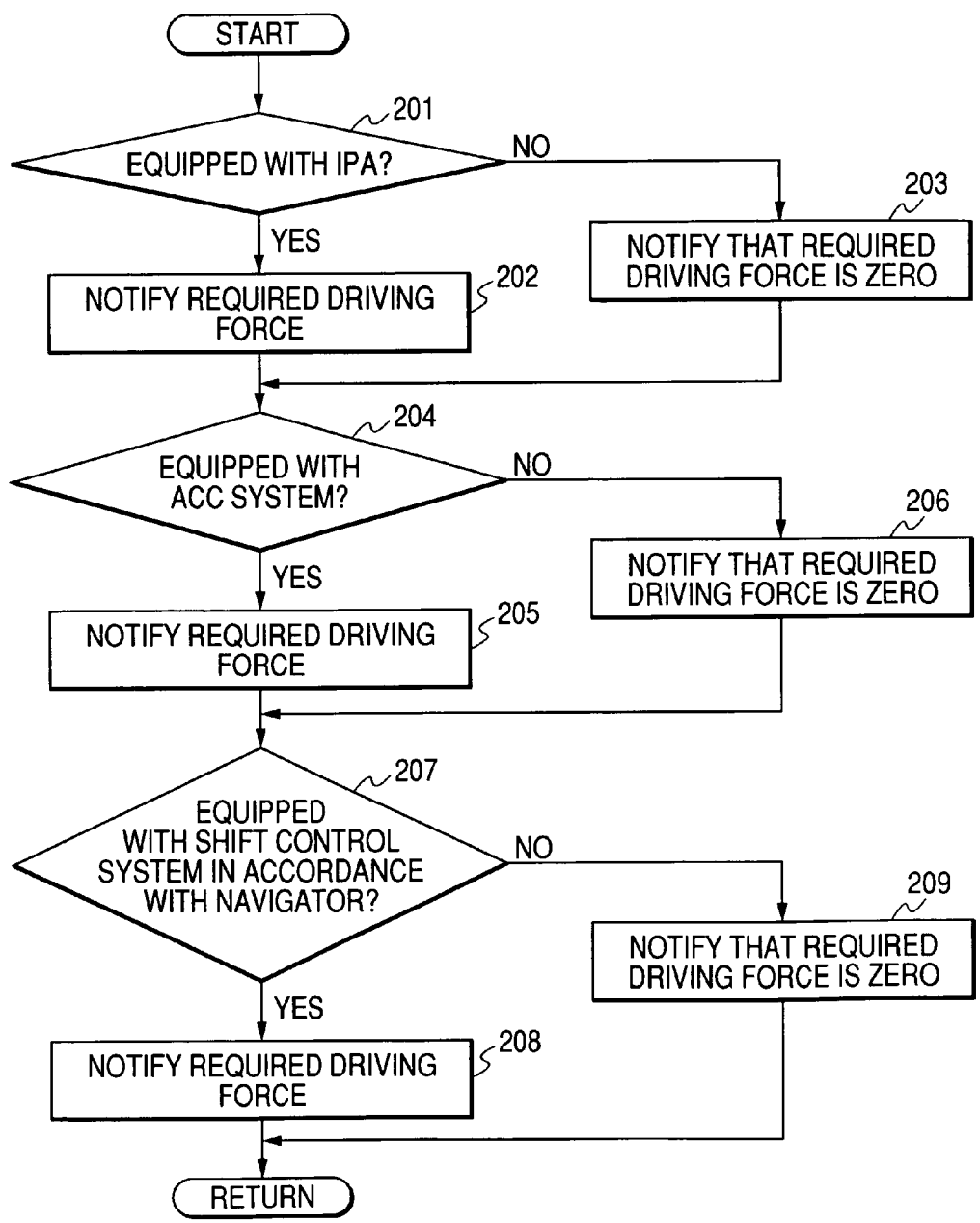
FIG. 4 is a flowchart showing operation of a driving-force arbitration section 33.

Similarly, the driving-force arbitration section 33 always executes a program shown in the flowchart of FIG. 4 during the period in which the ignition is turned on. If the program starts, first, the driving-force arbitration section 33 determines whether or not a vehicle is equipped with an intelligent parking assist (IPA) (Step 201). If the driving-force arbitration section 33 determines that the vehicle is equipped with the IPA, the driving-force arbitration section 33 notifies the cooperation control section 31 of a driving force required by the IPA (Step 202). If the driving-force arbitration section 33 determines that the vehicle is not equipped with the IPA, the driving-force arbitration section 33 notifies the cooperation control section 31 that the driving force required by IPA is zero (Step 203).

Next, the driving-force arbitration section 33 determines whether or not the vehicle is equipped with an adaptive cruise control (ACC) system (Step 204). If the driving-force arbitration section 33 determines that the vehicle is equipped with the ACC system, the driving-force arbitration section 33 notifies the cooperation control section 31 of a driving force required by the ACC system (Step 205). If the driving-force arbitration section 33 determines that the vehicle is not equipped with the ACC system, the driving-force arbitration section 33 notifies the cooperation control section 31 that the driving force required by ACC is zero (Step S206).

Thereafter, the driving-force arbitration section 33 determines whether or not the vehicle is equipped with a shift control system cooperating with navigation system (Step 207). If the driving-force arbitration section 33 determines that the vehicle is equipped with the shift control system cooperating with navigation system, the driving-force arbitration section 33 notifies the cooperation control section 31 of a driving force required by the shift control system cooperating with navigation system (Step208). If the driving-force arbitration section 33 determines that the vehicle is not equipped with the shift control system cooperating with navigation system, the driving-force arbitration section 33 notifies the cooperation control section 31 that the driving force required by the shift control system cooperating with navigation system is zero (Step 209).

Accordingly, if the vehicle is equipped with the respective systems, the cooperation control section 31 is notified of the required driving force when the vehicle is automatically parked by the intelligent parking assist or the required driving force when the vehicle travels using the adaptive cruise control system. Thus, the cooperation control section 31 adds the required driving force to the target driving force Ft.

Further, in the case where the shift control system cooperating with navigation system performs applies the brake in front of a corner, for example, the driving force (deceleration force) required in front of an intersection or a curve is notified to the cooperation control section 31. Thus, the cooperation control section 31 subtracts the required driving force from the target driving force Ft.

Figure 5:
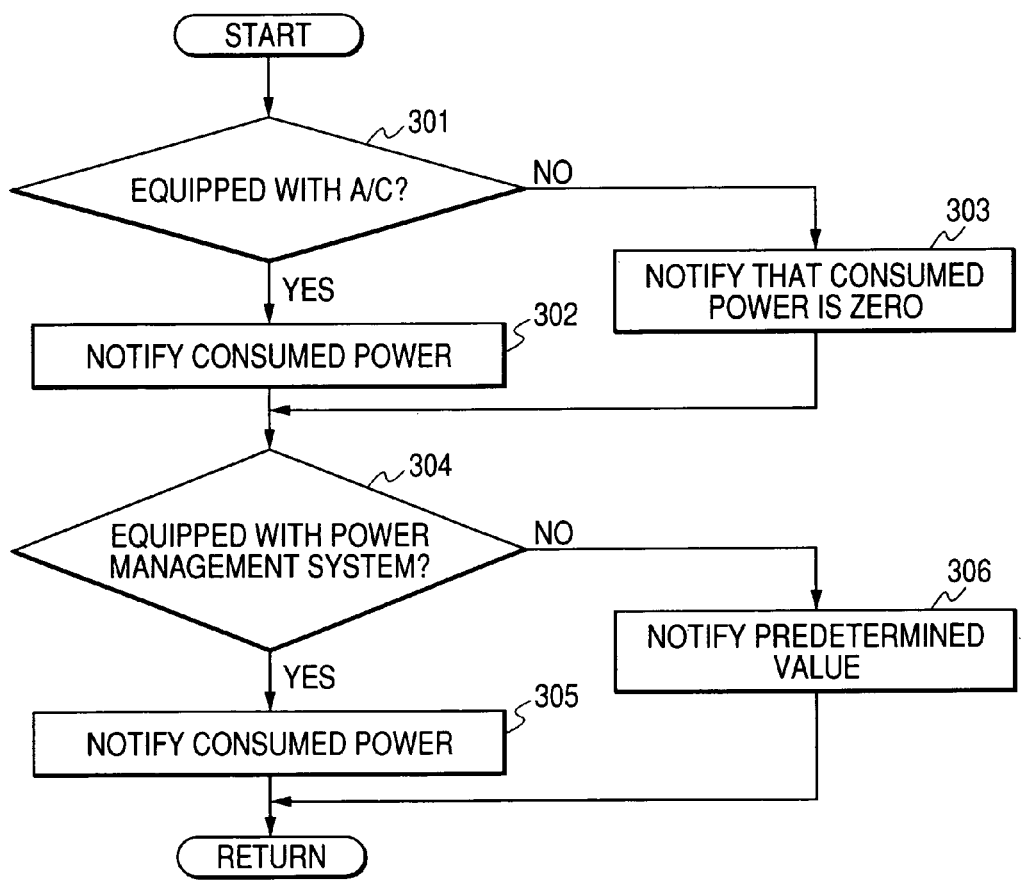
FIG. 5 is a flowchart showing operation of a power arbitration section 34.

Moreover, similarly, the power arbitration section 34 always executes a program shown in the flowchart of FIG. 5 during the period in which the ignition is turned on. When the program starts, first, the power arbitration section 34 determines whether or not the vehicle is equipped with an air conditioner (A/C) (Step 301). If the power arbitration section 34 determines that the vehicle is equipped with the A/C, the power arbitration section 34 notifies the cooperation control section 31 of power consumed by the A/C (Step 302). If the power arbitration section 34 determines that the vehicle is not equipped with the A/C, the power arbitration section 34 notifies the cooperation control section 31 that the power consumed by the A/c is zero (Step S303).

Next, the power arbitration section 34 determines whether or not the vehicle is equipped with a power management system, which manages charging of an alternator (Step S304). If the power arbitration section 34 determines that the vehicle is equippedwith the power management system, the power arbitration section 34 notifies the cooperation control section 31 of power consumed by the power management system (Step S305). If the power arbitration section 34 determines that the vehicle is equipped with the power management system, the power arbitration section 34 notifies the cooperation control section of a predetermined value, for example, 10 amperes (A) (Step S306).

As such, if the vehicle is equipped with the air conditioner or the power management system, when the air conditioner is operating or the alternator is being charged, the power of the engine is consumed. Thus, the power arbitration section 34 notifies the cooperation control section 31 of the power (output), which is consumed by the air conditioner or the charging of the alternator (ALT). Then, the cooperation control section 31 adds the consumed power to the target power Pt.

Moreover, since operation of a wiper or a defogger is a load with respect to the engine and thus needs torque, the torque arbitration section 35 notifies the cooperation control section 31 of an amount of torque consumed by the wiper or the defogger. Then, the cooperation control section 31 adds the amount of consumed torque to the target torque Tet.

As described above, since the interfaces between the respective control functions of the vehicle control section 1 and the interfaces of the commands to the unit control section 2 are taken as physical quantities, such as torque and power, so as not to depend on the logic of software. Therefore, software dependency relation can be weakened, and efficient development and improved software quality can be achieved for specification change and mounting/demounting of vehicle control applications.

Figure 6:
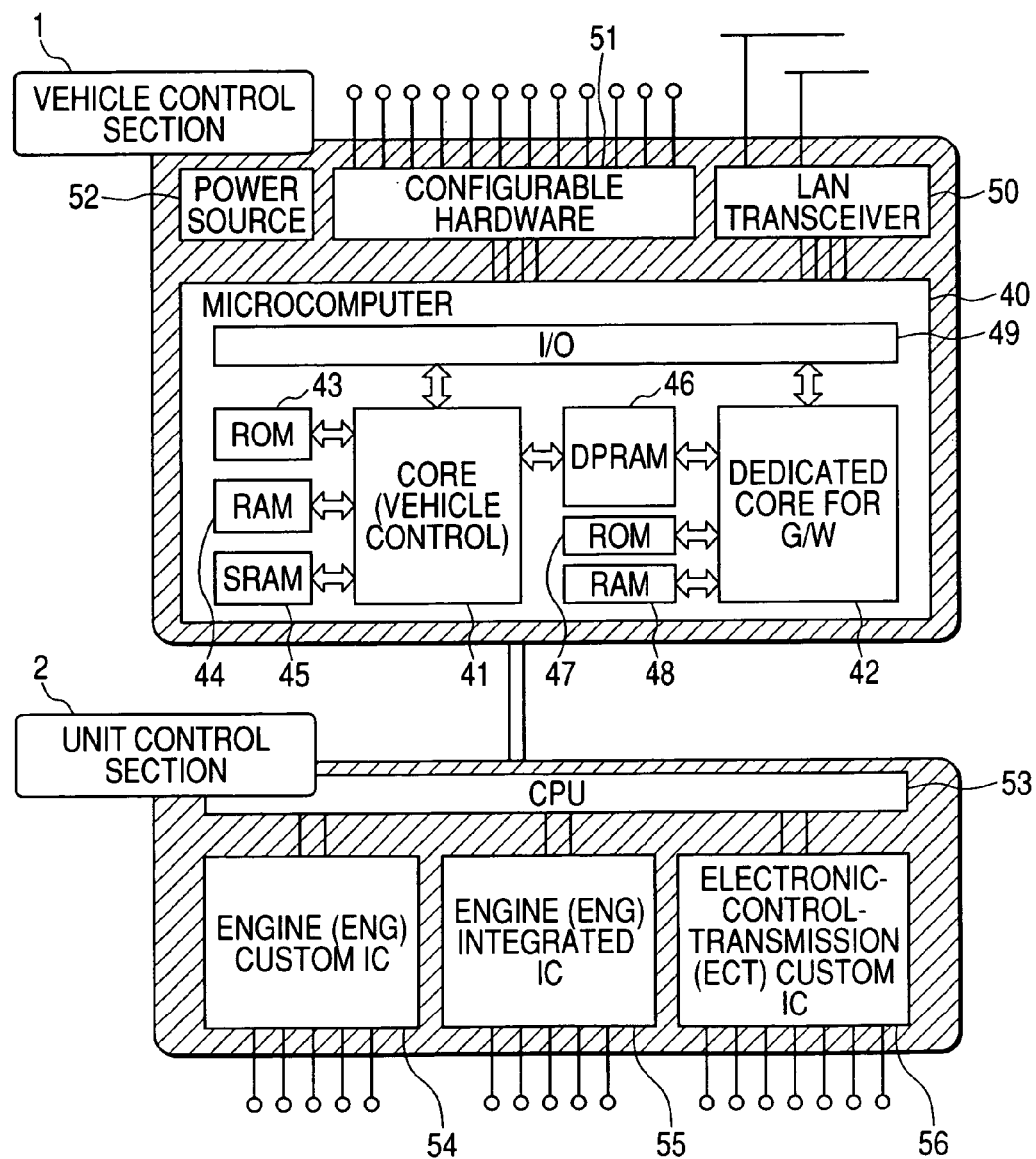
FIG. 6 is a view showing a hardware configuration of the vehicle control section 1 and a unit control section 2, which are shown in FIG. 1.
Figure 7:
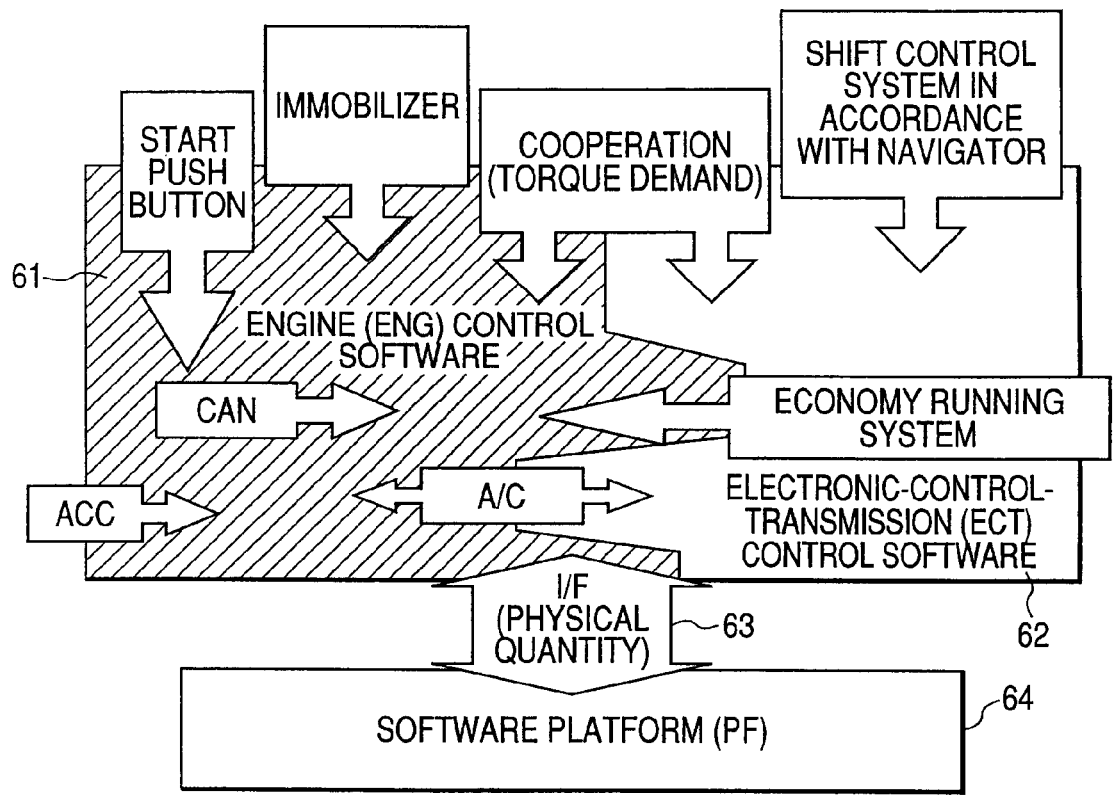
FIG. 7 is a view showing a configuration of a powertrain ECU according to a related art.
Figure 8:
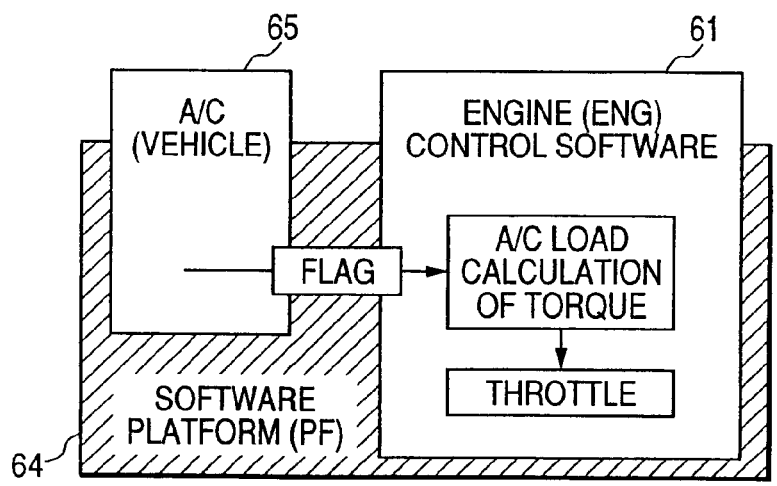
FIG. 8 is a view for explaining an example of programs relating to a vehicle equipment.

On the other hand, FIG. 6 is a view showing a software configuration of the vehicle control section 1 and the unit control section 2. The vehicle control section 1 includes a microcomputer 40, a LAN transceiver 50, configurable hardware 51, and a power source 52. The unit control section 2 includes a CPU 53, an ENG custom IC 54, an ENG integrated IC 55, and an ECT custom IC 56. The microcomputer 40 includes a CPU having two cores, i.e., a core 41 and a core 42, memories such as a ROM 43, a RAM 44, an SRAM 45, a DPRAM 46, a ROM, 47 and a RAM 48, and an I/O 49.

The configurable hardware 51 of the vehicle control section 1 is hardware, which can set hardware circuit characteristics and/or logical circuits by software. A field programmable gate array (FPGA) is also an example of the configurable hardware 51.

Further, the CPU of the vehicle control section 1 includes the two cores, i.e., the cores 41 and 42. The core 41 is a CPU core that performs vehicle control. The core 41 performs arithmetic processing for the processing contents (ECO, ACC, IPA, ALT charging, etc.) of the vehicle control section 1 in FIG. 2. The core 42 is a dedicated core for communication-processing, which exclusively performs communication (G/W=gateway) processing.

Moreover, the DPRAM (Dual Port RAM) 46 is a RAM that can be accessed from the two cores 41 and 42, respectively. By storing communication data in the DPRAM, the core 41 is allowed to refer to and update data flowing through communication paths (lines) without awareness of the communication processing.

As described above, since the CPU of the microcomputer of the vehicle control section 1 is configured with the two cores such that the communication processing is performed by the exclusive core, it is possible to perform communication processing without having influence of an increase in processing load caused by an increase in communication traffic on the vehicle control.

Further, since the vehicle control section 1 has, as an input circuit section, the configurable hardware 51 that can set or change circuit characteristics or logical circuit by software, and this configurable hardware 51 can cope with change of the equipment, if any, by configuration thereof, changes in design of the hardware can be made unnecessary.

What is claimed is:

1. A powertrain electronic control apparatus (ECU) that controls only a powertrain unit including an engine and a transmission mounted on a vehicle, the powertrain ECU being communicatable with a plurality of other ECUs that control a plurality of vehicle equipments other than the powertrain unit, the powertrain ECU comprising:

a vehicle control section that receives data from the plurality of other ECUs or the plurality of vehicle equipments, and a unit control section that controls a function of the powertrain unit, wherein the vehicle control section is disposed on a first software platform which is implemented on a first hardware and the unit control section is disposed on a second software platform which is different from the first software platform and is implemented on a second hardware which is different from the first hardware, wherein the vehicle control section includes a plurality of softwares, each of which corresponds to a different one of the plurality of vehicle equipments, the plurality of softwares calculate the received data and output calculation results to the unit control section;

wherein one of the softwares is configured to calculate at least one of:

a driving force, which is required or consumed by one of the plurality of vehicle equipments, and a torque, which is required or consumed by one of the plurality of vehicle equipments, wherein the vehicle control section includes an arbitration section for arbitrating each requirement from the plurality of vehicle equipments or each consumption amount of the plurality of vehicle equipments, wherein the vehicle control section outputs an arbitration result to the unit control section, and wherein the unit control section controls the function of the powertrain unit based on the calculation results and the arbitration result.

2. The powertrain ECU according to claim 1, wherein:
the vehicle control section comprises a determination section for determining whether or not one of the plurality of vehicle equipments is mounted on the vehicle;
if the determination section determines that the one of the plurality of vehicle equipments is mounted on the vehicle, the vehicle control section notifies the arbitration section of a control value required by the one of the plurality of vehicle equipments; and
if the determination section determines that the one of the plurality of vehicle equipments is not mounted on the vehicle, the vehicle control section notifies the arbitration section of a predetermined value as the control value.

3. The powertrain ECU according to claim 1, wherein physical quantities are used as information including the calculation results and the arbitration result, which is transmitted and received between the vehicle control section and the unit control section.

4. The powertrain ECU according to claim 1, wherein
a microcomputer of the vehicle control section has two cores; and
one of the cores is a dedicated core for communication processing.

5. The powertrain ECU according to claim 1, wherein an input circuit section of the vehicle control section comprises a configurable hardware that can set or change circuit characteristics and a logic circuit by software.

6. The powertrain ECU according to claim 1, wherein:
the vehicle control section includes a vehicle equipment control program that calculates the received data to be used for controlling the engine and the transmission; and
the unit control section comprises powertrain control programs unique to the engine and the transmission.

7. A method for controlling a vehicle having a powertrain electronic control apparatus (ECU) that controls only a powertrain unit including an engine and a transmission mounted on a vehicle, the powertrain ECU being communicatable with a plurality of other ECUs that control a plurality of vehicle equipments other than the powertrain unit, the powertrain ECU comprising: a vehicle control section that receives data from the plurality of other ECUs or the plurality of vehicle equipments, and a unit control section that controls a function of the powertrain unit, wherein the vehicle control section is disposed on a first software platform which is implemented on a first hardware and the unit control section is disposed on a second software platform which is different from the first software platform and is implemented on a second hardware which is different from the first hardware, wherein the vehicle control section includes a plurality of softwares, each of which corresponds to a different one of the plurality of vehicle equipments, the plurality of softwares calculate the received data and output calculation results to the unit control section, the method comprising:
calculating at least one of the driving force and the torque required or consumed by the plurality of vehicle equipments;
arbitrating each requirement from the plurality of vehicle equipments or each consumption amount of the plurality of vehicle equipments; and
controlling the powertrain unit based on results of calculation and arbitration to the unit control section.

8. The method according to claim 7, further comprising:
determining whether or not one of the plurality of vehicle equipments is mounted on the vehicle, and controlling the powertrain unit based on a result of determination.

9. The powertrain ECU according to claim 1, wherein the plurality of vehicle equipments includes at least one of an intelligent parking assist, an adaptive cruise control system, a shift control system and an air conditioner.

* * * * *